United States Patent
Iacopetti et al.

(10) Patent No.: US 10,968,526 B2
(45) Date of Patent: Apr. 6, 2021

(54) ELECTROLYSIS CELL OF ALKALI SOLUTIONS

(71) Applicant: INDUSTRIE DE NORA S.P.A., Milan (IT)

(72) Inventors: Luciano Iacopetti, Milan (IT); Antonio Lorenzo Antozzi, Merate (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 14/436,314

(22) PCT Filed: Oct. 15, 2013

(86) PCT No.: PCT/EP2013/071534
§ 371 (c)(1),
(2) Date: Apr. 16, 2015

(87) PCT Pub. No.: WO2014/060417
PCT Pub. Date: Apr. 24, 2014

(65) Prior Publication Data
US 2015/0240368 A1 Aug. 27, 2015

(30) Foreign Application Priority Data
Oct. 16, 2012 (IT) .......................... MI2012A001736

(51) Int. Cl.
*C25B 9/23* (2021.01)
*H01M 4/86* (2006.01)
(Continued)

(52) U.S. Cl.
CPC .................. *C25B 9/23* (2021.01); *C25B 1/02* (2013.01); *C25B 1/04* (2013.01); *C25B 9/73* (2021.01);
(Continued)

(58) Field of Classification Search
CPC .... C25B 9/10; C25B 1/02; C25B 1/10; C25B 11/035; H01M 4/8657; Y02E 60/366
See application file for complete search history.

(56) References Cited

U.S. PATENT DOCUMENTS 4,305,793 A * 12/1981 Broniewski ............... C25B 1/46
204/263
4,732,660 A 3/1988 Plowman et al.
(Continued)

FOREIGN PATENT DOCUMENTS

EP 1985727 A1 10/2008
WO WO-2005012596 A1 * 2/2005 ............... C25B 9/08

OTHER PUBLICATIONS

Bulan et al. (WO 2005012596 A1, machine translation) (Year: 2005).*
(Continued)

*Primary Examiner* — Maris R Kessel
*Assistant Examiner* — Joshua L Allen
(74) *Attorney, Agent, or Firm* — Lucas & Mercanti, LLP

(57) ABSTRACT

The invention relates to an electrolysis cell of alkali solutions partitioned by an ion-exchange membrane into an anodic compartment in which an alkaline electrolyte is circulated and a cathodic compartment consisting of a gas chamber; the cathodic compartment contains a gas-diffusion cathode in whose interior an electrolyte film coming from the anodic compartment percolates.

8 Claims, 1 Drawing Sheet

(51) Int. Cl.
*C25B 1/04* (2021.01)
*C25B 9/73* (2021.01)
*C25B 11/031* (2021.01)
*C25B 1/02* (2006.01)

(52) U.S. Cl.
CPC ......... *C25B 11/031* (2021.01); *H01M 4/8657* (2013.01); *Y02E 60/36* (2013.01)

(56) References Cited

U.S. PATENT DOCUMENTS

| | | | | |
|---|---|---|---|---|
| 5,316,643 A * | 5/1994 | Ahn | .................... | H01M 4/8615 204/265 |
| 5,650,058 A * | 7/1997 | Wenske | .................... | C25B 9/08 204/252 |
| 6,024,855 A * | 2/2000 | Sharifian | ................ | B01D 61/52 204/522 |
| 6,488,833 B1 * | 12/2002 | Sakata | ...................... | C25B 1/46 205/515 |
| 2003/0017379 A1 * | 1/2003 | Menashi | ............. | H01M 8/1004 502/185 |
| 2005/0106450 A1 * | 5/2005 | Castro | ................... | C25B 11/035 429/480 |
| 2008/0264780 A1 * | 10/2008 | Kato | ........................ | C25B 1/04 204/252 |
| 2010/0288647 A1 * | 11/2010 | Highgate | ............ | C02F 1/46104 205/628 |
| 2011/0048962 A1 * | 3/2011 | Reece | ....................... | C25B 1/04 205/633 |
| 2012/0031772 A1 * | 2/2012 | Dean | ........................ | C25B 1/10 205/637 |
| 2012/0175268 A1 * | 7/2012 | Joshi | ........................ | C25B 1/04 205/412 |
| 2014/0183054 A1 * | 7/2014 | Legzdins | ................ | C02F 1/461 205/343 |

OTHER PUBLICATIONS

International Search Report issued in PCT Application No. PCT/EP2013/071534.
International Preliminary Report on Patentability issued in PCT Application No. PCT/EP2013/071534.

* cited by examiner

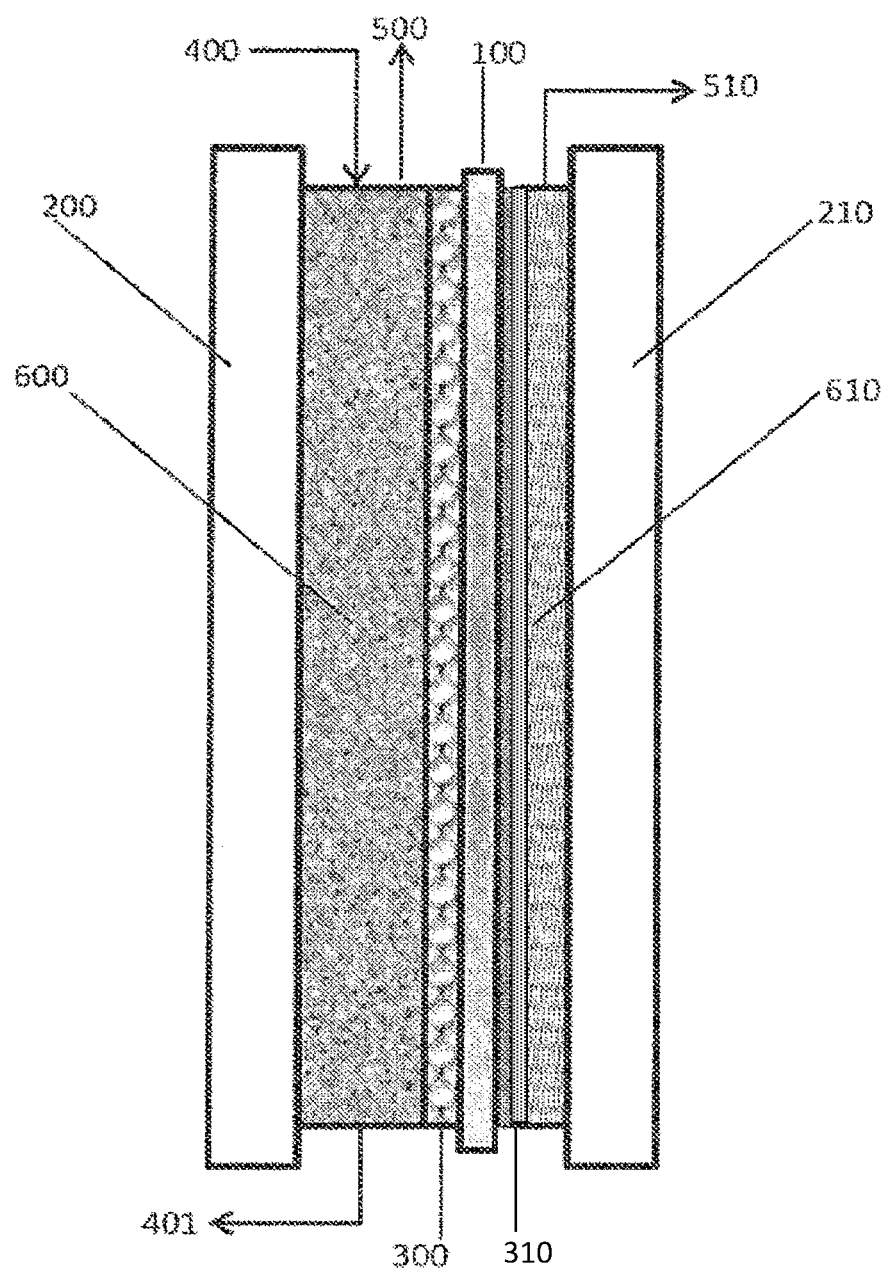

ELECTROLYSIS CELL OF ALKALI SOLUTIONS

This application is a U.S. national stage of PCT/EP2013/071534 filed on Oct. 13, 2015 which claims the benefit of priority from Italy Patent Application No. MI2012A001736 filed Oct. 16, 2012, the contents of each of which are incorporated herein by reference.

FIELD OF THE INVENTION

The invention relates to an electrochemical cell, with particular reference to a caustic soda or potash electrolysis cell with cathodic production of hydrogen and anodic production of oxygen.

BACKGROUND OF THE INVENTION

Production of hydrogen and oxygen by electrolysis of aqueous solutions is widely known in the art. Technologies based on electrolysis of either acidic or alkaline solutions were employed in the past, the latter being largely preferred due to the lesser aggressiveness of electrolytes, allowing a wider selection of metallic materials for their manufacturing. The electrolysis of alkali solutions, such as caustic soda or potash, is practiced in cells partitioned by semipermeable diaphragms at atmospheric pressure since seventy years on an industrial scale. As it is well known, commonly used diaphragms present severe limitations in terms of process conditions, being unsuitable for pressurized operation in safety conditions and for high current density operation, for instance above 3 kA/m$^2$. In addition, for the sake of simplifying the process, the electrolyte at the outlet of the cathodic compartment, whose pH would tend to increase under the effect of the cathodic reaction, has to be blended with the electrolyte at the outlet of the anodic compartment, whose pH conversely tends to decrease, prior to being recycled to the cell. Hydrogen and oxygen dissolved in these two outlet flows, albeit in a limited amount, end up mixing, thereby diminishing the purity of the final products: from a commercial standpoint this is considered particularly critical for product hydrogen.

In the attempt of overcoming such limitations, a generation of electrolytic cells called "PEM" or "SPE" (respectively from "Proton Exchange Membrane" or "Solid Polymer Electrolyte") capable of electrolyzing pure water was developed at a later time, based on the use of ion-exchange membranes, suitably catalyzed on the two faces, to separate two compartments consisting of gas chambers; ion-exchange membranes are in fact capable of withstanding pressure differentials of a few bars and can be operated at much higher current density, which in extreme cases may reach values around 25 kA/m$^2$. Also PEM/SPE cells nevertheless present some important drawbacks, especially associated with difficulties in designing big size cells in the absence of a highly conductive electrolyte capable of compensating for the constructive tolerances and preserving local electrical continuity. For this reason, it is generally considered that the maximum power which can be installed for this kind of technology is in the order of few kW.

There has thus been identified the need of providing an electrolytic technology for production of hydrogen and oxygen overcoming the limitations of the prior art, coupling a high purity of products with the capability of operating at high current density on a large scale.

SUMMARY OF THE INVENTION

Various aspects of the invention are set out in the accompanying claims.

Under one aspect, the invention relates to a cell for electrolysis of alkali solutions subdivided by an ion-exchange membrane into an anodic compartment and a cathodic compartment, the anodic compartment consisting of a liquid chamber fed with an alkaline electrolyte, typically caustic soda or potash, delimited by an anodic wall and the membrane and containing an anode suitable for oxygen evolution; the cathodic compartment consisting of a gas chamber delimited by a cathodic wall and the membrane and containing a gas-diffusion cathode, which is in intimate contact with the membrane through a preferably hydrophilic layer activated with a catalyst for hydrogen evolution. Inside the gas-diffusion cathode, an electrolyte film coming from the anodic compartment percolates. In the present context, the term liquid chamber is used to designate a compartment substantially filled with an electrolyte in liquid phase and gas chamber designates a compartment substantially filled with gas namely hydrogen produced by the reaction in which a liquid phase is present only as thin electrolyte film permeating across the membrane from the liquid chamber and percolating along the cathode structure, or at most in form of isolated droplets inside the gaseous phase. By gas-diffusion cathode is intended herein an electrode provided with a porous layer, suitable for gas transport, usually obtained starting from carbon or metal cloths, sintered metals, carbon paper and similar, usually provided with one or more diffusion layers consisting of mixtures of metal or carbon powders and polymer binders, optionally sintered; such layers or part of them may be suitably catalyzed. Electrodes of this kind are normally fed with gaseous reactants, for instance to achieve oxygen reduction or hydrogen oxidation in fuel cells or in depolarized electrolysis cells, but in the context of the present invention it was observed how it is possible to obtain an excellent functioning of gas-diffusion electrodes fed with alkaline electrolyte to achieve cathodic hydrogen evolution. An effective percolation of an electrolyte film inside the gas-diffusion cathode is ensured by the presence of at least one diffusion layer with sufficient hydrophilic characteristics. The hydrophilicity or hydrophobicity degree of diffusive layers can be adjusted, as known in the art, by acting on the ratio of hydrophilic (for instance carbonaceous or metal powders) to hydrophobic components (for instance polymer binders); a suitable selection of different carbon powders may also be used to adjust hydrophilicity of electrode layers. In the cell according to the invention the electrolyte is circulated by suitable feeding and discharging means in the anodic compartment only, inside which an anode for electrolytic evolution of oxygen is present, normally consisting of a nickel substrate coated with films containing catalysts based on metal oxides, for instance pertaining to the family of spinels or perovskites. The cathodic compartment is not involved in the circulation of liquid phase electrolyte. Circulating liquid electrolyte in one compartment only has the advantage of not requiring the remixing of a catholyte and an anolyte at the cell outlet in order to adjust pH, with important consequences on the purity of gaseous products, besides the apparent simplification of cell and system engineering. A further advantage is the possibility of accomplishing, as the overall electrolytic process, the electrolysis of water by coupling an alkaline electrolyte, not entailing any particular problem of corrosion, to a cation-exchange membrane, which resulted too complex from a system engineering standpoint with the cells of prior art having an electrolyte circulation in both compartments. The use of a cation-exchange membrane as separator, absolutely atypical in electrolysis of alkaline solutions, entails a further enhanced gas separation even at pressurized conditions, allowing operation with significant pressure differentials between one compartment to the other which contribute optimizing the overall efficiency. Among the positive effects on system engineering of liquid electrolyte circulation in a single compartment, also the substantial elimination of stray currents on the cathode side (hydrogen exiting substantially separated from the liquid phase, which is discharged in a discontinuous mode) and the simplified thermal regulation, which can be carried out by acting on anolyte temperature alone, may be mentioned, as it will be evident to a person skilled in the art. On the other hand, the cell according to the invention also presents doubtless advantages with respect to PEM/SPE-type cells, since the presence of a highly conductive liquid electrolyte allows operating with less stringent constructive tolerances, compensating for the zones where local electrical contact is more critical.

In one embodiment, the gas-diffusion cathode is provided with a catalyzed hydrophilic layer in direct contact with the membrane and an external hydrophobic layer, suitable for favouring the release of the gaseous product. This can have the advantage of improving mass transport phenomena, allowing the liquid electrolyte to easily access catalytic sites and providing the gas with a preferential outlet path, while minimizing the leakage of electrolyte droplets to the interior of the gas chamber. The hydrophobic layer may also be non-catalyzed. In one embodiment, the gas-diffusion cathode is activated, at least in the hydrophilic layer, with a platinum-containing catalyst. Platinum is particularly suitable for cathodic hydrogen evolution from alkali solutions in terms of activity and stability; as an alternative, it is possible to use catalysts based on other elements such as palladium, rhodium or iridium.

In one embodiment, the ion-exchange membrane is a non-reinforced monolayer sulphonic membrane of the type commonly employed for fuel cell applications. Inventors observed that non-reinforced membranes even of reduced thickness, provided they are adequately supported by a suitable mechanical design, show high performances at the indicated process conditions even when operated with an alkaline electrolyte. This has the advantage of allowing the use of a type of membrane characterized by a reduced ohmic drop and a relatively moderate cost with respect to monolayer sulphonic membranes equipped with an internal reinforcement, typical of industrial applications with alkaline electrolytes and giving rise to significantly higher cell voltages. Similar advantages are observed compared to anion-exchange membranes sometimes used in industrial applications, with the additional benefit of a much higher electrical efficiency and better properties in term of separation of anolyte and catholyte, with obvious consequences on purity of product hydrogen.

In one embodiment, the cathode and the cathodic wall are put in electrical contact by means of a current collector consisting of a porous metal structure, optionally a nickel or steel foam. This can have the advantage of establishing an electrical contact by densely distributed points along the whole surface of the cathode, which could have a rather low superficial conductivity when obtained from a carbonaceous substrate, such lack of conductivity being not adequately compensated by the presence of a support electrolyte; at the same time, this kind of current collecting elements can guarantee an equally well distributed mechanical support at reduced mechanical loads, contributing to the protection of the ion-exchange membrane even in conditions of differential pressurization between the two cell compartments.

In one embodiment, the anode for oxygen evolution consists of a substrate made of a nickel or steel mesh or expanded or punched sheet, optionally activated with a catalytic coating. Nickel and steel are materials typically used for cathodic compartments of industrial membrane electrolyzers; the particular conditions of electrolyte composition made possible by the cell design according to the invention allow their use also for the anodic compartment, simplifying the cell construction. In one embodiment, the anode for oxygen evolution is positioned in direct contact with the membrane, in order to eliminate the ohmic drop associated to the electrolyte inside the anode-to-membrane gap.

In one embodiment, also the anode for oxygen evolution is put in electrical contact with the relevant anodic wall by means of a current collector consisting of a porous metal structure, optionally a nickel or steel foam, similarly to the collector disclosed for the cathode side, further contributing to an optimum mechanical support of the membrane/cathode package. The dimensioning of the anodic collector may be different from that of the cathodic collector, especially in terms of porosity and of density of contact points, since on one hand the circulation of a liquid electrolyte may be favoured by more open and permeable structures, and on the other hand the presence of such electrolyte and the metallic nature of the electrode diminish the need of distributing the electrical contact in an extremely dense fashion. An optimum dimensioning of the above described current collectors may allow positioning the anode in direct contact with the membrane, supporting the latter in an adequate way while substantially limiting the risk of punching or otherwise damaging the same, for instance by abrasion.

Under another aspect, the invention relates to an electrolyser of alkaline solutions consisting of a modular arrangement of cells as hereinbefore described, electrically connected through the anodic and cathodic walls according to a bipolar or monopolar configuration, that is in series or in parallel.

Under another aspect, the invention relates to an electrolytic process comprising feeding an electrolyte consisting of an alkali metal hydroxide solution, such as caustic soda or potash, to the anodic compartment of a cell as hereinbefore described, with percolation of an electrolyte film inside the hydrophilic layer of the corresponding cathode; supplying direct electrical current upon connection of the cathodic compartment to the negative pole and of the anodic compartment to the positive pole of a rectifier or other direct power supply; withdrawing exhaust electrolyte containing dissolved oxygen from the anodic compartment and hydrogen produced on the electrolyte percolating film in form of pre-separated gas.

In one embodiment, the process electrolyte consists of an aqueous solution of caustic soda at 10 to 45% by weight concentration, more preferably 15 to 35% by weight concentration. This can have the advantage of achieving an optimum process efficiency while adequately preserving the ion-exchange membrane integrity.

Some implementations exemplifying the invention will now be described with reference to the attached FIGURE, which has the sole purpose of illustrating the reciprocal arrangement of the different elements relatively to said particular implementations of the invention; in particular, elements are not necessarily drawn to scale.

BRIEF DESCRIPTION OF THE FIGURE

FIG. 1 shows a side sectional view of an electrolysis cell according to the invention.

DETAILED DESCRIPTION OF THE FIGURE

FIG. 1 shows a side sectional view of an electrolysis cell subdivided by means of an ion-exchange membrane 100 into an anodic compartment and a cathodic compartment; the anodic compartment consists of a liquid chamber delimited at the side opposite membrane 100 by an anodic wall 200; inside the anodic compartment, an anode 300 consisting of a substrate made of a mesh or other porous metal structure is present in direct contact with membrane 100 or spaced apart therefrom at most by a very small predefined gap, in the order of magnitude of a few millimeters. The electrical contact between anode 300 and the corresponding anodic wall 200 is achieved through an anodic current collector 600 consisting of a porous metal structure, for instance a nickel or steel foam or mat. The anodic compartment is equipped with feed 400 and discharge 401 means of process electrolyte, for instance caustic soda or potash. The FIGURE shows electrolyte feed from the top and discharge from the bottom, but the cell may be operated also by feeding the electrolyte bottom up. At the anodic compartment, oxygen 500 is produced and discharged in form of bubbles within the electrolyte phase. The cathodic compartment consists of a gas chamber delimited at the side opposite membrane 100 by a cathodic wall 210; a gas-diffusion cathode 310 is arranged in intimate contact with membrane 100, for instance by hot pressing or other known technique. The electrical contact between gas-diffusion cathode 310 and cathodic wall 210 is achieved through a cathodic current collector 610 consisting of a porous metal structure, preferably a nickel or steel foam. The cathodic compartment is free of means for electrolyte circulation; the cathodic product consists of hydrogen 510 evolving within gas-diffusion cathode 310 and hence discharged pre-separated from the liquid phase. The latter is in its turn discharged as small discontinuous flow (not shown) from the bottom part of the cathodic compartment. The illustrated cell also comprises a gasketing system (not shown) and tightening means, for instance tie-rods distributed along the perimeter of the anodic and cathodic walls (not shown). It will be clear to a person skilled in the art how cells as hereinbefore described are suitable for being employed as modular elements of an electrolyser. By way of example, an electrolyser in bipolar configuration, consisting of a stack of cells connected in electrical series, can be obtained by assembling the cells so that each of the intermediate cell walls acts at the same time as the anodic wall of one cell and as the cathodic wall of an adjacent cell, according to a filter-press design widely known in the art.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

Example

Two electrolyzers were assembled, one comprised of eight and the other of four cells of the type illustrated in the FIGURE having an electrode area of 63 $cm^2$, mutually connected in electrical series and assembled in a filter-press bipolar configuration. The walls delimiting the different cell compartments were obtained out of a nickel sheet. As the anodic current collector a nickel mat made of four layers of interlaced and superposed wires with an uncompressed thickness of 2 mm and as the cathodic current collector a 1 mm thick nickel foam were used. The anodes were made of a nickel mesh, activated with a thin layer of catalyst containing a mixtures of oxides of lanthanum, cobalt and nickel, assembled in intimate contact with the membrane. The gas-diffusion cathode was made of a carbon cloth activated with a hydrophilic layer consisting of a 20% by weight platinum-based catalyst supported on high surface area carbon black, soaked with a Nafion® sulphonated perfluorinated ionomer dispersion from DuPont, deposited upon the carbon cloth by spraying, at a total Pt loading of 0.5 mg/$cm^2$. On the hydrophilic layer side opposite the membrane a hydrophobic layer was deposited also by spraying, obtained from a mixture of low surface area carbon black and PTFE, in a 1:1 weight proportion. The gas-diffusion cathode was overlaid to a monolayer sulphonic Nafion® membrane manufactured by DuPont and cold-pressed under the effect of cell tightening. To reach equilibrium conditions sooner, inventors have also verified the possibility of hot pressing the cathode and the membrane previously to the cell assemblage.

The electrolyzers were operated in two test campaigns of 3000 hours, one on caustic potash and the other on caustic soda, varying, electrolyte concentration (up to 45% by weight of alkali), current density (up to 9.5 kA/$m^2$) and cathodic pressure (1 to 2 bar absolute). In all tests, hydrogen of purity comparable to the one obtainable with a PEM/SPE pure water electrolyser was produced. Performances in terms of cell voltage were completely aligned to the expectations also at atmospheric pressure and moderate electrolyte concentration: by operating with 20% caustic soda at atmospheric conditions for instance, a stable voltage of 1.95 V was obtained at 9.5 kA/$m^2$.

Counterexample

A four cell electrolyser was assembled similar to the one of the above example except for the replacement of the gas-diffusion cathode with a nickel mesh activated with a 5 g/$m^2$ platinum galvanic coating, assembled in intimate contact with the membrane. The test campaign of the previous example was repeated operating at atmospheric pressure only, since pressurisation of cells with two metal meshes in contact with the two faces of the membrane was considered too hazardous for the integrity of the latter. By operating on 20% caustic soda, a stable voltage of 2.34 V was obtained at 9.5 kA/$m^2$.

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. A cell for electrolysis of alkaline solutions comprising:
a cation-exchange membrane partitioning the cell into:
an anodic compartment,
a cathodic compartment, and
an alkaline electrolyte consisting of an aqueous solution of caustic soda comprising 10-45% by weight of concentration,
said anodic compartment consisting of a liquid chamber delimited by an anodic wall and by said cation-exchange membrane and filled with the alkaline electrolyte,
said anodic compartment containing an anode suitable for oxygen evolution, the anode comprising a nickel mesh activated with a thin layer of catalyst containing a mixtures of oxides of lanthanum, cobalt and nickel assembled in direct contact with said cation-exchange membrane, the anodic compartment further comprising a feeding inlet and a discharging outlet for discharging the alkaline electrolyte,
said cathodic compartment consisting of a gas chamber delimited by a cathodic wall and by said cation-exchange membrane,
said cathodic compartment containing a gas-diffusion cathode,
said gas-diffusion cathode comprising a carbon cloth having a hydrophilic layer consisting of 20% by weight of a catalytically-activated layer consisting of a platinum, palladium, rhodium or iridium supported on high surface area carbon black, soaked with sulphonated perfluorinated ionomer dispersion and deposited upon the carbon cloth, and in direct contact with said cation-exchange membrane,
said gas-diffusion cathode further comprising an external hydrophobic layer suitable for facilitating the release of hydrogen to the gas chamber, the hydrophobic layer being a mixture of low surface area carbon black and polytetrafluoroethylene (PTFE) in a 1:1 weight proportion, and
said gas-diffusion cathode being suitable for the percolation of an electrolyte film coming from the anodic compartment.

2. The cell according to claim 1 wherein said catalytically-activated layer of said hydrophilic layer of the gas-diffusion cathode contains platinum.

3. The cell according to claim 1 wherein said cation-exchange membrane is a non-reinforced monolayer sulphonic membrane.

4. The cell according to claim 1 wherein said gas-diffusion cathode and said cathodic wall are put in electrical contact by means of a current collector consisting of a porous metal structure comprising distributed points of electrical contacts, wherein the porous metal structure is a nickel or steel foam.

5. The cell according to claim 1 wherein said anode suitable for oxygen evolution and said anodic wall are put in electrical contact by means of a current collector consisting of a porous metal structure, wherein the porous metal structure is a nickel or steel foam or mat.

6. The cell according to claim 1 wherein said anode suitable for oxygen evolution consists of a substrate made of a nickel or steel mesh or expanded or punched sheet, optionally activated with a catalytic coating.

7. An electrolyzer of alkaline solutions consisting of a modular arrangement of cells electrically connected through anodic and cathodic walls according to a bipolar or monopolar configuration, each cell comprising:
an anodic compartment,
a cathodic compartment,
a cation-exchange membrane between the anodic compartment and the cathodic compartment, and
an alkaline electrolyte consisting of an aqueous solution of caustic soda comprising 10-45% by weight of concentration,
said anodic compartment consisting of a liquid chamber delimited by an anodic wall and by said cation-exchange membrane and filled with the alkaline electrolyte,
said anodic compartment containing an anode suitable for oxygen evolution, the anode comprising a nickel mesh activated with a thin layer of catalyst containing a mixture of oxides of lanthanum, cobalt and nickel assembled in direct contact with said cation-exchange membrane, the anodic compartment further comprising a feeding inlet and a discharging outlet for discharging the alkaline electrolyte,
said cathodic compartment consisting of a gas chamber delimited by a cathodic wall and by said cation-exchange membrane,
said cathodic compartment containing a gas-diffusion cathode,
said gas-diffusion cathode comprising a carbon cloth having a hydrophilic layer consisting of 20% by weight of a catalytically-activated layer consisting of a platinum, palladium, rhodium or iridium supported on high surface area carbon black, soaked with sulphonated perfluorinated ionomer dispersion and deposited upon the carbon cloth, and in direct contact with said cation-exchange membrane,
said gas-diffusion cathode further comprising an external hydrophobic layer suitable for facilitating the release of hydrogen to the gas chamber, the hydrophobic layer being a mixture of low surface area carbon black and polytetrafluoroethylene (PTFE) in a 1:1 weight proportion, and
said gas-diffusion cathode being suitable for the percolation of an electrolyte film coming from the anodic compartment.

8. A process of electrolysis in the cell according to claim 1 comprising the steps of:
feeding the alkaline electrolyte consisting of the aqueous solution of caustic soda comprising 10-45% by weight of concentration to said anodic compartment, with percolation of the electrolyte film inside said gas-diffusion cathode;
connecting said cathodic compartment to a negative pole and said anodic compartment to a positive pole of a power unit, with subsequent supply of direct electrical current;
conducting cathodic evolution of hydrogen within said electrolyte film and discharge of said hydrogen from said cathodic compartment;
conducting evolution of oxygen on a surface of said anode; and withdrawing exhaust electrolyte containing dissolved oxygen from said anodic compartment.

\* \* \* \* \*